United States Patent
Zeng et al.

(10) Patent No.: US 11,611,128 B2
(45) Date of Patent: Mar. 21, 2023

(54) BATTERY AND RELATED APPARATUS, PRODUCTION METHOD AND PRODUCTION DEVICE THEREFOR

(71) Applicant: CONTEMPORARY AMPEREX TECHNOLOGY CO., LIMITED, Fujian (CN)

(72) Inventors: Yuqun Zeng, Fujian (CN); Zhimin Zeng, Fujian (CN); Kai Wu, Fujian (CN); Xingdi Chen, Fujian (CN); Peng Wang, Fujian (CN); Zhanyu Sun, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 92 days.

(21) Appl. No.: 17/113,018

(22) Filed: Dec. 5, 2020

(65) Prior Publication Data

US 2022/0013756 A1 Jan. 13, 2022

Related U.S. Application Data

(63) Continuation of application No. PCT/CN2020/101443, filed on Jul. 10, 2020.

(51) Int. Cl.
*H01M 50/375* (2021.01)
*H01M 50/342* (2021.01)
(Continued)

(52) U.S. Cl.
CPC ..... *H01M 50/342* (2021.01); *H01M 10/0525* (2013.01); *H01M 10/6567* (2015.04);
(Continued)

(58) Field of Classification Search
CPC ............ H01M 2200/20; H01M 50/30; H01M 50/308; H01M 50/317; H01M 50/325;
(Continued)

(56) References Cited

U.S. PATENT DOCUMENTS

| 2009/0220850 A1 | 9/2009 | Bitsche et al. |
| 2010/0323228 A1 | 12/2010 | Okamoto et al. |

(Continued)

FOREIGN PATENT DOCUMENTS

| CN | 207233830 U | 4/2018 |
| CN | 110061329 A | 7/2019 |

(Continued)

OTHER PUBLICATIONS

Machine Translation of CN209401662U (Year: 2019).*
Extended European Search Report dated Jan. 18, 2023 received in European Patent Application No. EP 22197975.0.

*Primary Examiner* — Imran Akram
(74) *Attorney, Agent, or Firm* — Scully Scott Murphy & Presser

(57) ABSTRACT

The present application discloses a battery and a related apparatus, production method and production device therefor. The battery includes: a battery cell, the battery cell including a pressure relief mechanism configured to be capable of being actuated when an internal pressure or temperature of the battery cell reaches a threshold, to relieve the internal pressure; an attachment component adapted to be attached to the battery cell by an adhesive; and an isolation component configured to be capable of preventing the adhesive from being applied between the attachment component and the pressure relief mechanism. By providing the isolation component, it is possible to prevent the adhesive from being applied between the attachment component and the pressure relief mechanism in an effective manner in a process of battery production. Meanwhile, application (Continued)

efficiency and accuracy of the adhesive could be improved, thereby improving production efficiency of the battery.

13 Claims, 8 Drawing Sheets

(51) Int. Cl.
*H01M 10/6567* (2014.01)
*H01M 50/24* (2021.01)
*H01M 50/325* (2021.01)
*H01M 50/593* (2021.01)
*H01M 10/0525* (2010.01)

(52) U.S. Cl.
CPC ......... *H01M 50/24* (2021.01); *H01M 50/325* (2021.01); *H01M 50/375* (2021.01); *H01M 50/593* (2021.01); *H01M 2200/10* (2013.01); *H01M 2200/20* (2013.01); *H01M 2220/20* (2013.01)

(58) Field of Classification Search
CPC ............. H01M 50/333; H01M 50/342; H01M 50/3425; H01M 50/35; H01M 50/358; H01M 50/367; H01M 50/375; H01M 50/383; H01M 50/392; H01M 50/394
See application file for complete search history.

(56) References Cited

U.S. PATENT DOCUMENTS

| | | |
|---|---|---|
| 2013/0059175 A1 | 3/2013 | Engel et al. |
| 2015/0236369 A1* | 8/2015 | Takatsuka ........... H01M 50/533 429/94 |
| 2017/0149103 A1 | 5/2017 | Yang et al. |
| 2017/0194771 A1* | 7/2017 | Aoki ................... H01M 50/507 |
| 2018/0134923 A1* | 5/2018 | Kurata ................ C09D 135/02 |
| 2019/0229384 A1 | 7/2019 | Tasiopoulos et al. |
| 2019/0393570 A1* | 12/2019 | Melack ............... H01M 10/617 |
| 2020/0185798 A1 | 6/2020 | Ing et al. |
| 2021/0104801 A1 | 4/2021 | Chu et al. |

FOREIGN PATENT DOCUMENTS

| | | |
|---|---|---|
| CN | 209104196 U | 7/2019 |
| CN | 209401662 U | 9/2019 |
| CN | 209947915 U | 1/2020 |
| CN | 111106277 A | 5/2020 |
| CN | 111106281 A | 5/2020 |
| CN | 210535737 U | 5/2020 |
| DE | 102017212223 A1 | 1/2019 |

\* cited by examiner

BATTERY AND RELATED APPARATUS, PRODUCTION METHOD AND PRODUCTION DEVICE THEREFOR

CROSS-REFERENCE TO RELATED APPLICATIONS

This application is a continuation of International Application No. PCT/CN2020/101443, filed on Jul. 10, 2020, which is hereby incorporated by reference in its entirety.

TECHNICAL FIELD

The present application relates to the field of batteries, and in particular, to a battery and a related apparatus, production method and production device therefor.

BACKGROUND

A chemical battery, electrochemical battery, or electrochemical cell refers to a type of apparatus that converts chemical energy of positive and negative active substances into electrical energy through a redox reaction. Unlike an ordinary redox reaction, oxidation and reduction reactions are carried out separately, with the oxidation reaction taking place at a negative electrode and the reduction reaction taking place at a positive electrode, and gain and loss of electrons are carried out through an external circuit, and thus a current is formed. This is an essential characteristic of all batteries. After long-term research and development, the chemical battery has ushered in a situation of great varieties and wide applications, for example, it may be a huge device that can accommodate a building, or a small device in millimeter. With the development of modern electronic technology, high requirements are put forward for the chemical battery. Every breakthrough in chemical battery technology brings revolutionary development of an electronic device. Many electrochemical scientists in the world have focused their research and development interests in the field of chemical batteries that power electric vehicles.

As a kind of chemical battery, a lithium-ion battery has advantages of small size, high energy density, high power density, multiple cycle times, long storage time, and the like, and has been widely applied in some electronic devices, electric vehicles, electric toys and electric devices. For example, currently, the lithium-ion battery is widely applied in mobile phones, notebook computers, electromobiles, electric vehicles, electric airplanes, electric ships, electric toy cars, electric toy ships, electric toy airplanes, electric tools, or the like.

With the continuous development of lithium-ion battery technology, higher requirements are put forward for performance of the lithium-ion battery. It is hoped that design factors in multiple aspects can be considered at the same time for the lithium-ion battery, and safety performance of the lithium-ion battery is particularly important.

SUMMARY

The present application provides a battery and a related apparatus, production method and production device therefor to improve safety performance of the battery.

According to a first aspect of the present application, a battery is provided, including a battery cell, the battery cell including a pressure relief mechanism configured to be capable of being actuated when an internal pressure or temperature of the battery cell reaches a threshold, to relieve the internal pressure; an attachment component adapted to be attached to the battery cell by an adhesive; and an isolation component configured to be capable of preventing the adhesive from being applied between the attachment component and the pressure relief mechanism.

By providing the isolation component, it is possible to prevent the adhesive from being applied between the attachment component and the pressure relief mechanism in an effective manner in a process of battery production. Meanwhile, application efficiency and accuracy of the adhesive could be improved, thereby improving production efficiency of the battery.

In some embodiments, the pressure relief mechanism has an actuation region, and the pressure relief mechanism is configured, when the internal pressure or temperature of the battery cell reaches the threshold, to be capable of forming a relief channel for relieving the internal pressure in the actuation region.

Through the relief channel formed in the actuation region when the pressure relief mechanism is actuated, emissions of the battery cell are guided to be discharged outwards via the formed relief channel if thermal runaway occurs in the battery, thereby improving safety performance of the battery.

In some embodiments, the isolation component is configured to at least surround the actuation region to prevent the adhesive from entering the actuation region.

The isolation component arranged in this manner can more reliably prevent the adhesive from hindering normal actuation of the pressure relief mechanism when the internal pressure or temperature of the battery cell reaches a threshold, and prevent the adhesive from flowing in to block the relief channel, so as to block discharge of the emissions relieved by the battery cell. Therefore, the safety performance of the battery could be further improved.

In some embodiments, the isolation component has a main body and a protrusion arranged protruding from a surface of the main body, the protrusion is arranged to correspond to a position of the actuation region of the pressure relief mechanism, and the protrusion is configured to at least surround the actuation region to prevent the adhesive from entering the actuation region.

This arrangement can prevent the adhesive from being applied to a surface of the pressure relief mechanism in a simple and effective manner in a process of battery production, and thus prevent the hindering of the pressure relief mechanism when it is actuated. Moreover, this arrangement can be flexibly designed into such an isolation component according to actual needs that a single isolation component can achieve the effect of isolating the adhesive with a plurality of protrusions respectively corresponding to the actuation region of a plurality of pressure relief mechanisms. This helps to reduce production costs.

In some embodiments, the attachment component includes an avoidance structure configured to provide a space allowing the pressure relief mechanism to be actuated, where an avoidance chamber is formed between the avoidance structure and the pressure relief mechanism.

The avoidance structure is arranged so that an operation space or action space required for effective actuation of the pressure relief mechanism can be more reliably ensured. In addition, the avoidance chamber can provide a buffer space for the emissions of the battery cell, thereby reducing impact pressure of the emissions of the battery cell to an external structure or a component and further improving the safety performance of the battery.

In some embodiments, the isolation component is configured to at least surround a peripheral edge of a side of the avoidance chamber facing the pressure relief mechanism to prevent the adhesive from entering the avoidance chamber.

The isolation component arranged in this manner can more reliably ensure that an operation space or action space required for effective actuation of the pressure relief mechanism provided by the avoidance chamber is not partially occupied by the adhesive without affecting normal actuation of the pressure relief mechanism, and also can ensure that the avoidance chamber can play a role in providing a buffer space when the emissions are relieved from the battery cell.

In some embodiments, the isolation component has a main body and a protrusion arranged protruding from a surface of the main body, the protrusion is arranged to correspond to a position of the avoidance chamber, and the protrusion is configured to at least surround a peripheral edge of the avoidance chamber facing the pressure relief mechanism to prevent the adhesive from entering the avoidance chamber.

This arrangement can prevent the adhesive from being applied to the avoidance chamber in a simple and effective manner in a process of battery production, so that the avoidance chamber can provide the operation space required for the effective actuation of the pressure relief mechanism. Moreover, this arrangement can be flexibly designed into such an isolation component according to actual needs that a single isolation component can achieve the effect of isolating adhesive with a plurality of protrusions respectively being covered and disposed on a plurality of avoidance chambers. This helps to reduce production costs.

In some embodiments, a height of the protrusion is greater than or equal to a predetermined application height of the adhesive, and the protrusion is configured to be compressed when the battery cell is attached to the attachment component, to have a height consistent with that of the adhesive.

This arrangement ensures that the protrusion can effectively prevent the adhesive from being applied between the attachment component and the pressure relief mechanism. Meanwhile, this enables the isolation component not to affect reliable adhesion between the attachment component and the pressure relief mechanism, and actuation of the pressure relief mechanism. Moreover, when the battery cell and the attachment component of the battery are glued and pressed or engaged by the adhesive coated on an adhesive surface, the protrusion may be compressed to a height consistent with that of the adhesive, so that no gap is left between adhesive surfaces of the battery cell and the attachment component of the battery by the protrusion, thus reliably ensuring that the adhesive is isolated from a region where the pressure relief mechanism is actuated and where a channel for the emissions is formed.

In some embodiments, the protrusion is formed on the surface of the main body by a blister process.

By adopting the blister process, the required isolation component may be processed and manufactured conveniently and at a low cost, and especially for a case of forming a plurality of protrusions on a single isolation component, it is particularly advantageous and economical to process and form a protrusion on the basis of a whole piece of sheet or a film by adopting the blister process.

In some embodiments, the isolation component is configured to be capable of being damaged by emissions from the battery cell when the pressure relief mechanism is actuated.

Thus, if thermal runaway occurs in the battery cell, the isolation component can be damaged by the emissions flowing out with the actuation of the pressure relief mechanism, thereby forming a channel for the emissions to flow out, which could improve the safety of the battery.

In some embodiments, the isolation component is made of a thermoplastic material having a melting point not greater than a discharge temperature of the emissions.

With this design, the isolation component has relatively high structural strength in a general use state where thermal runaway does not occur in the battery cell, and can be damaged by high-temperature and high-pressure emissions in a relatively short time in an emergency case where thermal runaway occurs in the battery cell, so that the emissions may be quickly discharged from the battery cell.

In some embodiments, the isolation component comprises a coating for preventing the adhesive from being applied thereto. Thus, the isolation component may also be achieved by a structure without a protrusion.

In some embodiments, the attachment component includes a thermal management component for accommodating a fluid to reduce a temperature of the battery cell. By providing the thermal management component, the temperature of the battery cell can be controlled more flexibly and actively, and the risk of thermal runaway of the battery cell can be reduced.

In some embodiments, the avoidance structure is formed in the thermal management component, and the avoidance structure includes an avoidance bottom wall and an avoidance side wall surrounding the avoidance chamber. This arrangement achieves the design of the thermal management component and the avoidance structure in a simple manner and at a lower cost, and integrating the avoidance structure into the thermal management component helps to reduce the occupation of space, and further helps to improve the energy density of the battery.

In some embodiments, the avoidance side wall is configured to be damaged when the pressure relief mechanism is actuated, such that the fluid flows out.

This arrangement enables the fluid to flow out if necessary at a low cost and in a simple manner, so that the fluid is used to quickly reduce a temperature of the emissions discharged from the battery cell in the case of thermal runaway, and further improve the safety performance of the battery.

According to a second aspect of the present application, an apparatus is provided, which includes the battery described in the foregoing first aspect, and the battery is configured to provide electrical energy to the apparatus.

According to a third aspect of the present application, a method for producing a battery is further provided, including providing a plurality of battery cells, at least one battery cell of the plurality of battery cells including: a pressure relief mechanism configured to be capable of being actuated when an internal pressure or temperature of the battery cell reaches a threshold, to relieve the internal pressure; providing an attachment component adapted to be attached to the battery cell by an adhesive; providing an isolation component configured to be capable of preventing the adhesive from being applied between the attachment component and the pressure relief mechanism; and applying the adhesive to attach the battery cell to the attachment component.

By providing the isolation component, it is possible to prevent the adhesive from being applied between the attachment component and the pressure relief mechanism in an effective manner in a process of battery production. Meanwhile, application efficiency and accuracy of the adhesive could be improved, thereby improving production efficiency of the battery.

In some embodiments, the pressure relief mechanism has an actuation region, and the pressure relief mechanism is configured, when the internal pressure or temperature of the battery cell reaches the threshold, to be capable of forming a relief channel for releasing relieving the internal pressure in the actuation region; and the isolation component has a main body and a protrusion arranged protruding from a surface of the main body, the protrusion is arranged to correspond to a position of the actuation region of the pressure relief mechanism, and the protrusion is configured to at least surround the actuation region to prevent the adhesive from entering the actuation region.

Thus, it is possible to prevent the adhesive from being applied to a surface of the pressure relief mechanism in a simple and effective manner in a process of battery production, and thus prevent the hindering of the pressure relief mechanism when it is actuated. Moreover, an isolation component can be flexibly processed and manufactured according to actual needs, so that the manufactured single isolation component can achieve the effect of isolating the adhesive with a plurality of protrusions respectively corresponding to the actuation region of a plurality of pressure relief mechanisms, which is helpful for reducing production costs.

In some embodiments, the attachment component includes an avoidance structure configured to provide a space allowing the pressure relief mechanism to be actuated, and an avoidance chamber is formed between the avoidance structure and the pressure relief mechanism, and the isolation component has a main body and a protrusion arranged protruding from a surface of the main body, the protrusion is arranged to correspond to a position of the avoidance chamber, and the protrusion is configured to at least surround a peripheral edge of the avoidance chamber facing the pressure relief mechanism to prevent the adhesive from entering the avoidance chamber.

Thus, in a process of battery production, it is possible to prevent the adhesive in a simple and effective manner from being applied to the avoidance chamber which may hinder the actuation of the pressure relief mechanism and forms a channel for the emissions to flow and pass through, without hindering the pressure relief mechanism from giving full play to its designed function. Moreover, an isolation component can be flexibly processed and manufactured according to actual needs, so that the manufactured single isolation component can achieve the effect of isolating the adhesive with a plurality of protrusions respectively corresponding to a plurality of avoidance chambers, which is helpful for reducing production costs.

In some embodiments, the providing the isolation component includes forming the protrusion on the surface of the main body by a blister process. By adopting the blister process, the required isolation component may be processed and manufactured conveniently and at a low cost.

According to a fourth aspect of the present application, a device for producing a battery is provided, including: a battery cell production module for producing a plurality of battery cells, at least one battery cell of the plurality of battery cells including: a pressure relief mechanism configured to be capable of being actuated when an internal pressure or temperature of the battery cell reaches a threshold, to relieve the internal pressure; an attachment component production module for producing an attachment component adapted to be attached to the battery cell by an adhesive; an isolation component production module for producing an isolation component configured to be capable of preventing the adhesive from being applied between the attachment component and the pressure relief mechanism; and an assembling module for mounting and fixing the isolation component relative to the battery cell or the attachment component, and applying the adhesive to attach the battery cell to the attachment component.

BRIEF DESCRIPTION OF THE DRAWINGS

The accompanying drawings described herein are intended to provide a further understanding of the present application and constitute a part of the present application. The illustrative embodiments of the present application and the description thereof are used to explain the present application and do not constitute an undue limitation to the present application. In the drawings.

DESCRIPTION OF EMBODIMENTS

Figure 1:
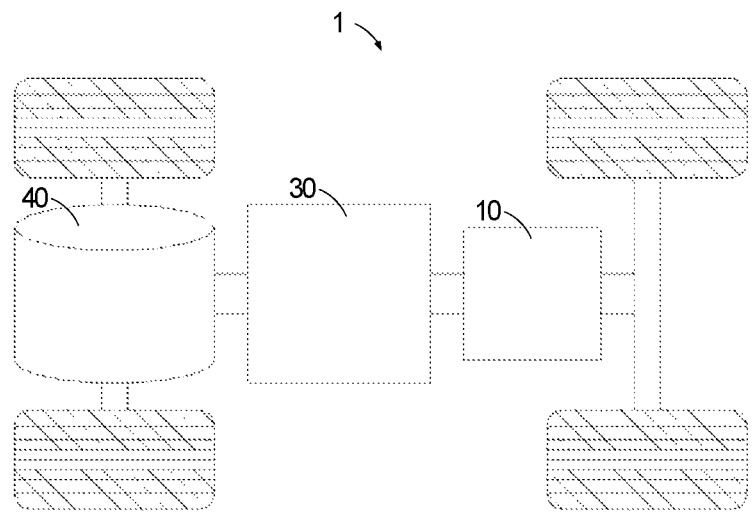
FIG. 1 shows a schematic structural diagram of some embodiments of a vehicle using a battery of the present application.

To make the objectives, technical solutions, and advantages of the present application clearer, the technical solutions in embodiments of the present application will be clearly and completely described below with reference to the accompanying drawings showing a plurality of embodiments according to the present application. It should be understood that, the described embodiments are merely some of, rather than all of, the embodiments of the present application. All the other embodiments obtained by those of ordinary skill in the art based on the embodiments disclosed in the present application without creative efforts shall fall within the scope of protection of the present application.

Unless otherwise defined, all technical and scientific terms used in the present application have the same meanings as those commonly understood by those skilled in the technical art to which the present application pertains. Terms used in the specification of the present application are merely for the purpose of describing specific embodiments, but are not intended to limit the present application. The terms "comprising", "including", "having", "possessing", "containing", "involving" and the like in the specification, the claims as well as the foregoing description of the foregoing accompanying drawings of the present application are open words. Therefore, a method or apparatus "comprising", "including" or "having" for example one or more steps or elements, has one or more steps or elements, but is not limited to merely having the one or more elements. The terms "first", "second", and the like in the specification, the claims, or the foregoing accompanying drawings of the present application, are intended to distinguish between different objects, rather than to describe a specific order or primary-secondary relationship. In addition, the terms "first" and "second" are only intended for the purpose of description, and shall not be understood as an indication or implication of relative importance or implicit indication of the quantity of indicated technical features. Therefore, a feature limited by "first" or "second" may explicitly or implicitly include one or more features. In the description of the present application, unless otherwise provided, "a plurality of" means two or more than two.

In the description of the present application, it should be understood that orientations or positional relationships indicated by terms such as "center", "crosswise", "length", "width", "up", "down", "front", "rear", "left", "right", "vertical", "horizontal", "top", "bottom", "inside", "outside", "axial direction", "radial direction" and "circumferential direction" are orientations or positional relationships shown based on the drawings, and the terms are merely for convenience of describing the present application and for simplifying the description, but for indicating or implying that an indicated apparatus or element must have a specific orientation, and must be constructed and operated in a specific orientation, which thus may not be understood as limiting the present application.

In the description of the present application, it should be noted that, unless explicitly specified and defined otherwise, terms "installation", "interconnection", "connection" and "attachment" should be understood broadly, for example, they may either be a fixed connection, or a detachable connection, or an integrated connection; and they may either be a direct connection, or an indirect connection through an intermediary, and they may be an internal connection between two elements. Those of ordinary skill in the art may appreciate the specific meanings of the foregoing terms in the present application according to specific conditions.

The phrase "embodiment" mentioned in the present application means that the specific features, structures, and characteristics described with reference to the embodiments may be included in at least one embodiment of the present application. The phrase at various locations in the specification does not necessarily refer to the same embodiment, or an independent or alternate embodiment that is mutually exclusive from another embodiment. Those skilled in the art understand, in explicit and implicit manners, that the embodiments described in the present application may be in combination with another embodiment.

As described above, it should be emphasized that the term "comprising/including", when used in this specification, is used to clearly specify the presence of stated features, integers, steps or assemblies, but do not preclude the presence or addition of one or more other features, integers, steps, or components or groups of features, integers, steps or components. As used in the present application, the singular form "a", "an" and "the" include plural forms unless the context clearly dictates otherwise.

The terms "a" and "an" in this specification can mean one, but may have the same meaning as "at least one" or "one or more". The term "about" generally means plus or minus 10%, or more specifically plus or minus 5%, of the mentioned value. The term "or" used in the claims means "and/or" unless it is clearly stated that it only refers to an alternative solution.

The term "and/or" in the present application merely describes an association relationship between associated objects, and indicates that there may be three relationships. For example, A and/or B may indicate three cases: A exists alone, both A and B exist, and B exists alone. In addition, the character "/" in the present application generally indicates that the associated previous and next objects are in the relationship of "or".

A battery mentioned in the art can be divided into a primary battery and a rechargeable battery according to whether it is rechargeable. The primary battery is also known as a "disposable" battery or a galvanic battery, because after its power is exhausted, it cannot be recharged and can only be discarded. The rechargeable battery is also called a secondary battery, a second-level battery, or a storage battery. Manufacturing materials and processes of the rechargeable battery are different from those of the primary battery. Its advantage is that it can be cycled multiple times after being charged, and output current load capacity of the rechargeable battery is higher than that of most primary batteries. At present, common types of rechargeable batteries are: a lead-acid battery, a Ni-MH battery and a lithium-ion battery. The lithium-ion battery has the advantages such as light weight, large capacity (1.5 to 2 times that of Ni-MH battery of the same weight), and no memory effect, and has a very low self-discharge rate, so even if its price is relatively high, it still gets widely used. The lithium-ion battery is also used in battery electric vehicles and hybrid vehicles. The capacity of lithium-ion battery for this purpose is relatively low, but it has a larger output and charging current, and a longer service life, but a higher cost.

A battery described in an embodiment of the present application refers to a rechargeable battery. Hereinafter, the concept of the present application will be described mainly by an example of a lithium-ion battery. It should be understood that any other suitable type of a rechargeable battery is applicable. The battery mentioned in the embodiment of the present application refers to a single physical module including one or more battery cells to provide a higher voltage and capacity. For example, the battery mentioned in the present application may include a battery module, a battery pack, and the like. The battery cell includes a positive electrode sheet, a negative electrode sheet, an electrolytic solution and an isolation film, which are basic structural units of a battery module and a battery pack. Generally, the battery cell is divided into three types according to the way of packaging: a cylindrical battery cell, a prismatic battery cell and a pouch battery cell.

The operation of a lithium-ion battery cell mainly relies on movement of lithium ions between the positive electrode sheet and the negative electrode sheet. The lithium ion battery cell uses one embedded lithium compound as one electrode material. Currently, main common materials used as a cathode material of a lithium-ion battery are: lithium cobalt oxide ($LiCoO_2$), lithium manganese oxide ($LiMn_2O_4$), lithium nickel oxide ($LiNiO_2$) and lithium iron phosphate ($LiFePO_4$). The isolation film is provided between the positive electrode sheet and the negative electrode sheet to form a thin film structure with three layers of materials. The thin film structure is generally made into an electrode assembly in a desired shape by winding or stacking. For example, a thin film structure with three layers of materials in a cylindrical battery cell is wound into a cylindrical electrode assembly, while a thin film structure in a prismatic battery cell is wound or stacked into an electrode assembly in a substantially cuboid shape.

A plurality of battery cells may be connected in series and/or in parallel via electrode terminals for various applications. In some high-power applications such as electric automobiles, application of a battery includes three levels: a battery cell, a battery module, and a battery pack. The battery module is formed by electrically connecting a certain number of battery cells together and putting them in a frame in order to protect the battery cells from external impact, heat, vibration, or the like. The battery pack is a final state of a battery system installed in an electric automobile. Most existing battery packs are made by assembling various control and protection systems such as a battery management system (BMS) and a thermal management component on one or more battery modules. With the development of technology, the level of battery module may be omitted, that is, a battery pack is directly formed from a battery cell. This improvement allows the battery system to significantly reduce the number of components while increasing weight energy density and volume energy density. The battery mentioned in the present application includes a battery module or a battery pack.

With respect to the battery cell, the main safety hazard comes from the charging and discharging process, and in order to effectively avoid unnecessary risks and losses, at least triple protection measures are generally taken for the battery cell. Specifically, the protection measures include at least a switching element, a properly selected isolation film material and a pressure relief mechanism. The switching element refers to an element that can stop the charging or discharging of the battery when the temperature or resistance in the battery cell reaches a certain threshold. The isolation film is configured to isolate a positive electrode sheet from a negative electrode sheet, and may automatically dissolve micron-sized (or even nanoscale) micropores attached to the isolation film when the temperature rises to a certain value, so that lithium ions cannot pass through the isolation film and the internal reaction of the battery cell is terminated.

A pressure relief mechanism refers to an element or component that can be actuated when the internal pressure or internal temperature of a battery cell reaches a predetermined threshold, to relieve the internal pressure and/or internal substances. The pressure relief mechanism may specifically take the form of an anti-explosion valve, a gas valve, a pressure relief valve, a safety valve, or the like, and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, thereby forming an opening or channel for internal pressure relief. The threshold referred to in the present application may be a pressure threshold or a temperature threshold. The threshold design varies according to different design requirements. For example, the threshold may be designed or determined according to an internal pressure or internal temperature value of a battery cell that is considered to have danger and a risk of being out of control. Moreover, the threshold may, for example depend on the material of one or more of the positive electrode sheet, the negative electrode sheet, the electrolytic solution and the isolation film in the battery cell.

The "actuation" mentioned in the present application means that the pressure relief mechanism acts or is activated to a certain state, such that the internal pressure of the battery cell can be relieved. The action executed by the pressure relief mechanism may include but be not limited to: at least a portion of the pressure relief mechanism being fractured, broken, torn or opened and so on. When the pressure relief mechanism is actuated, high-temperature and high-pressure substances inside the battery cell are discharged outwards from an actuated position as emissions. In this way, the pressure of the battery cell can be relieved under a controllable pressure or temperature, thereby avoiding potential, more serious accidents. The emissions from the battery cell mentioned in the present application include but are not limited to: an electrolytic solution, dissolved or split positive and negative electrode sheets, fragments of an isolation film, high-temperature and high-pressure gas generated by reaction, flame, or the like. The high-temperature and high-pressure emissions are discharged toward a direction in which the pressure relief mechanism of the battery cell is provided, and more specifically, may be discharged in a direction toward a region where the pressure relief mechanism is actuated. The strength and destructive power of such emissions may be very great, and may even be great enough to break through one or more structures such as a cover body in this direction.

In some traditional solutions, the pressure relief mechanism is generally provided on a cover plate of the battery cell. In some improved technical solutions, the pressure relief mechanism may also be provided on other sides of the battery cell or a housing structure of other directions. However, regardless of an arrangement manner or arrangement position of the pressure relief mechanism, it is necessary to attach or assemble the battery cell to the attachment component by using the attachment component properly arranged in the battery through an adhesive (also referred to as glue or a binder), where the attachment component may specifically include an attachment component in the battery such as a thermal management component and a support component, and the adhesive may adopt, for example, thermally conductive silica gel, epoxy resin adhesive, polyurethane adhesive, or the like.

It can be understood that the support component referred to in the present application may generally be understood as a component for providing support for the battery cell or resisting the gravity of the battery cell, which can generally be attached to a bottom wall or bottom of the housing of the battery cell to support the battery cell or fix the battery cell thereon. The thermal management component is a component for accommodating a fluid to adjust the temperature of the battery cell, where the fluid here may be liquid or gas, and adjusting the temperature refers to heating or cooling the battery cell. Typically, the thermal management component for cooling or lowering the temperature the battery cell may also be referred to as a cooling component, a cooling system or a cooling plate, or the like, which accommodates a cooling medium such as cooling liquid or cooling gas, where the cooling medium may be designed to be circular to achieve better temperature adjustment effects. The cooling medium may specifically use water, a mixture of water and ethylene glycol, or air, or the like. The attachment component generally refers to a portion of the battery that is adhered with the battery cell by the adhesive. As mentioned above, the attachment component may be provided by or composed of the thermal management component or the support component, besides, the attachment component may also be provided by any other suitable component in the battery.

Regardless of which part of the battery is used as the attachment component, this manner of assembling the battery cell to the battery using the adhesive generally refers to applying or coating the adhesive on adhesive surfaces on which the attachment component and the battery cell are attached to each other, and then engaging the adhesive surfaces corresponding to the battery cell and the attachment component in a surface adhering manner by using the adhesive force and cohesive force generated after the curing of the adhesive, and thus the purpose of assembling the battery cell to the attachment component may be achieved. This design and its processing manner are widely applied because of its advantages of easy implementation, simple processes, low costs and firm and reliable attachment.

However, after conducting a great deal of research and experiments, the inventor of the present application found that the widely adopted design for attaching the battery cell to the attachment component in the battery by using the adhesive may unexpectedly have an adverse effect on the design of the pressure relief mechanism aimed at providing reliable guarantee for the use safety of the battery cell.

Specifically, on the one hand, when the adhesive is coated, some adhesive may flow into a region related to the actuation of the pressure relief mechanism due to careless coating of an excessive adhesive in a certain region or inclination of the adhesive surface coated with the adhesive. In this case, if the inflow adhesive is not cleaned additionally, this portion of the adhesive after curing is possible to adversely affect the actuation of the pressure relief mechanism, and even block or partially block a channel or opening that is provided for the emissions to flow out and is formed when the pressure relief mechanism is actuated, thereby affecting the relief of the emissions.

On the other hand, the pressure relief mechanism in the battery cell is actuated when the internal pressure or temperature of the battery cell reaches a predetermined threshold, the high-temperature and high-pressure substances inside the battery cell are discharged outwards from an actuated position as emissions. At this time, the high-temperature and high-pressure emissions enable, due to its own destructive power and/or high temperature in a relieving process, an adhesive coated on an adhesive surface near a path where emissions pass by to melt and flow into a region related to the actuation of the pressure relief mechanism, such as a position where the pressure relief mechanism is actuated, or a channel or opening formed by the actuation of the pressure relief mechanism for emissions to flow out, thereby adversely affecting relief of the emissions.

In order to ensure that the pressure relief mechanism may play its designed function to relieve the high-temperature and high-pressure emissions inside the battery cell when necessary, it is necessary to prevent, in a certain manner, the adhesive such as thermally conductive silica gel from being applied to a region that may affect the actuation of the pressure relief mechanism or may affect the pressure relief mechanism to form an opening or channel for the emissions to flow out. However, for this reason, abandoning the manner of assembling the battery cell to the attachment component of the battery with the adhesive, or adding a barrier structure around adhesive surfaces on which the adhesive needs to be applied to the battery cell or the attachment component will significantly increase the manufacturing difficulty and production costs of the battery. Therefore, it is a difficult technical problem for a researcher or a person skilled in the art to solve how to ensure that the pressure relief mechanism provided in the battery cell can play its designed function so as to ensure the use safety of the battery, while keeping the manufacturing difficulty and production costs of the battery at a relatively expected low level as much as possible.

In order to solve or at least partially solve the foregoing problems and other potential problems of a battery in the prior art, the inventor of the present application proposes a novel battery, and the design of which will be described in detail below. It can be understood that the battery described in the embodiment of the present application is applicable to various apparatuses using batteries, such as mobile phones, portable devices, notebook computers, electromobiles, electric vehicles, ships, spacecrafts, electric toys, electric tools, or the like. For example, the spacecrafts include airplanes, rockets, space shuttles and spaceships, and the like; the electric toys include fixed or mobile electric toys, such as game consoles, electric vehicle toys, electric ship toys and electric airplane toys; the electric tools include electric metal cutting tools, electric grinding tools, electric assembling tools and electric railway tools, such as electric drills, electric grinders, electric spanners, electric screwdrivers, electric hammers, electric impact drills, concrete vibrators, and electric planers.

The battery described in an embodiment of the present application is not only applicable to the device described above, but also applicable to all devices using batteries. However, the following embodiments are all described by an example of an electric automobile for brevity.

For example, as shown in FIG. 1, the figure is a simplified schematic diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. As shown in FIG. 1, the vehicle 1 may be internally provided with a battery 10, for example, the battery 10 may be provided at the bottom, head or tail of the vehicle 1. The battery 10 may be used for power supply to the vehicle 1, for example, the battery 10 may be used as an operation power source of the vehicle 1. Moreover, the vehicle 1 may further include a controller 30 and a motor 40. The controller 30 is configured to control the battery 10 to supply power to the motor 40, for example, for a working power demand of the vehicle 1 during startup, navigation and driving. In another embodiment of the present application, the battery 10 may be used not only as an operation power source of the vehicle 1, but also as a driving power source of the vehicle 1, replacing or partially replacing fuel or natural gas to provide driving power for the vehicle 1. The battery 10 referred to below may also be understood as a battery pack including a plurality of battery cells 20.

Figure 2:
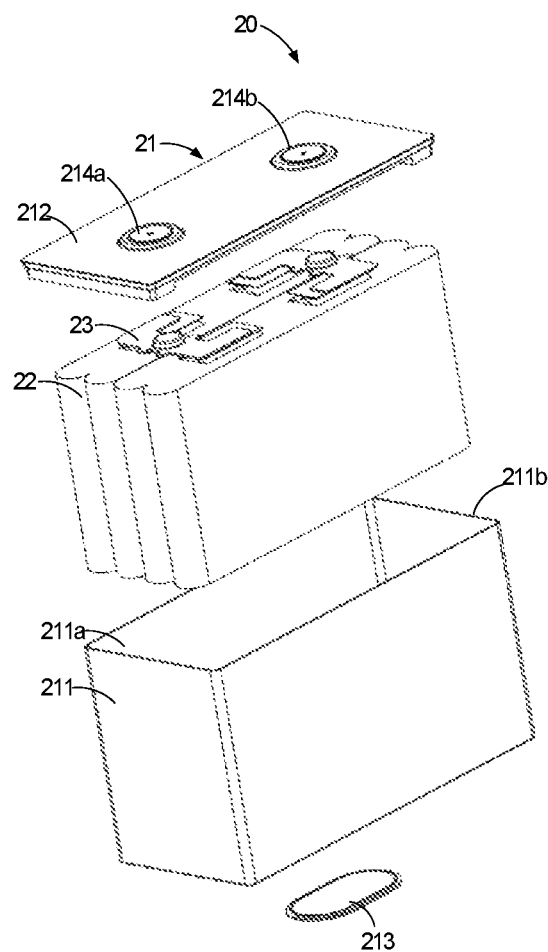
FIG. 2 shows a schematic exploded view of a battery cell according to some embodiments of the present application.
Figure 3:
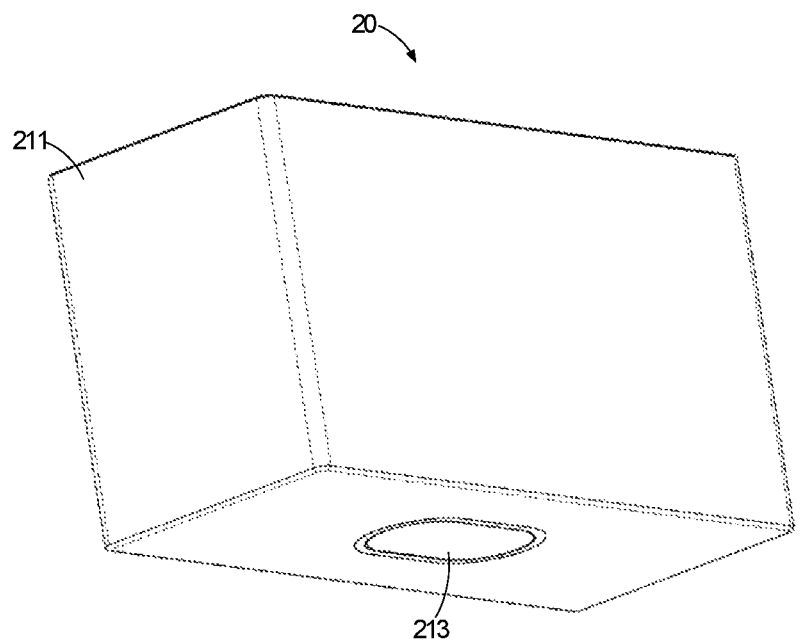
FIG. 3 shows a schematic perspective view of a battery cell according to some embodiments of the present application.
Figure 4:
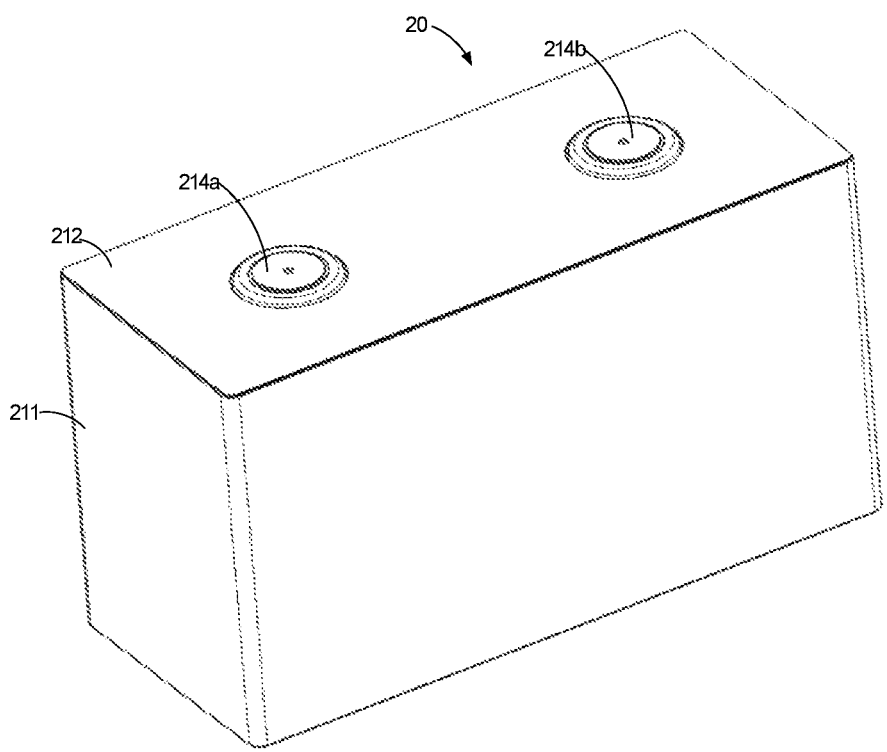
FIG. 4 shows a schematic perspective view of a battery cell according to some embodiments of the present application.

As shown in FIGS. 2-4, a battery cell 20 includes a box 21, an electrode assembly 22 and an electrolytic solution, where the electrode assembly 22 is accommodated in the box 21 of the battery cell 20, and the electrode assembly 22 includes a positive electrode sheet, a negative electrode sheet and an isolation film. A material of the isolation film may be PP, PE, or the like. The electrode assembly 22 may be a coiled structure or a laminated structure. The box 21 includes a housing 211 and a cover plate 212. The housing 211 includes an accommodation chamber 211a formed from a plurality of walls and an opening 211b. The cover plate 212 is arranged at the opening 211b to close the accommodation chamber 211a. In addition to the electrode assembly 22, the accommodation chamber 211a also accommodates an electrolytic solution. A positive electrode sheet and a negative electrode sheet in the electrode assembly 22 are generally provided with electrode tabs, and the electrode tabs generally include a positive electrode tab and a negative electrode tab.

Specifically, the positive electrode sheet includes a positive electrode current collector and a positive electrode active material layer. The positive electrode active material layer is coated on a surface of the positive electrode current collector, the positive electrode current collector not coated with the positive electrode active material layer protrudes from the positive electrode current collector coated with the positive electrode active material layer, and the positive electrode current collector not coated with the positive electrode active material layer is used as a positive electrode tab. A material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the negative electrode current collector not coated with the negative electrode active material layer protrudes from the negative electrode current collector coated with the negative electrode active material layer, and the negative electrode current collector not coated with the negative electrode active material layer is used as the negative electrode tab. A material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. The electrode tab is connected to a positive electrode terminal 214a and a negative electrode terminal 214b located outside the battery cell 20 through a connecting member 23. In the description of the present application, the positive electrode terminal 214a and the negative electrode terminal 214b are also collectively referred to as an electrode terminal 214. For a prismatic battery cell, as shown in FIG. 2 and FIG. 4, the electrode terminal 214 may generally be disposed on the cover plate 212.

Figure 5:
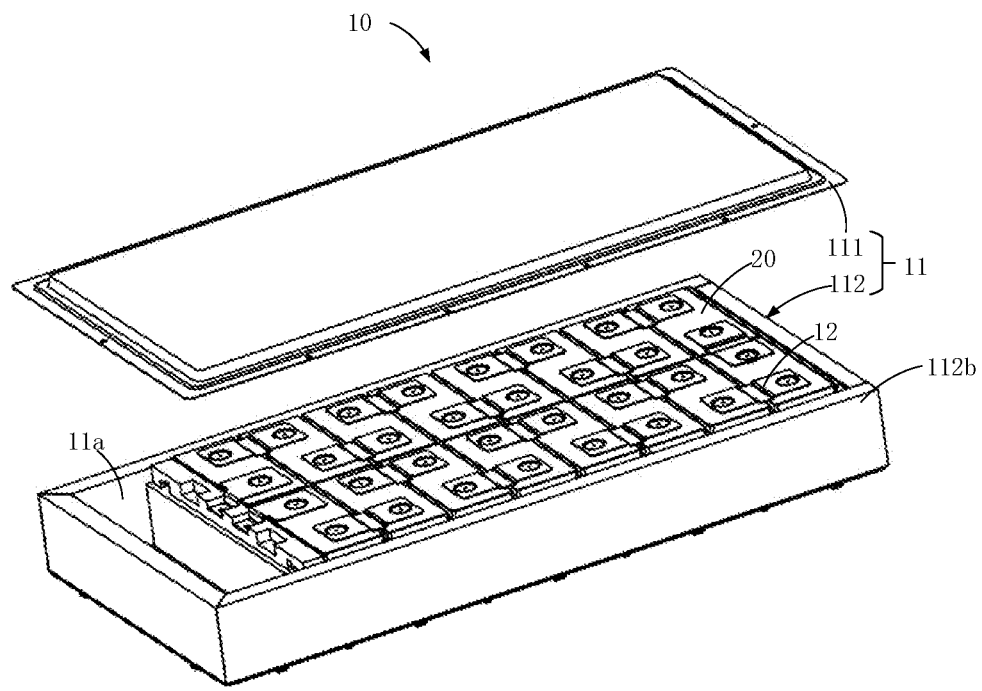
FIG. 5 shows a schematic exploded view of a battery according to some embodiments of the present application.
Figure 6:
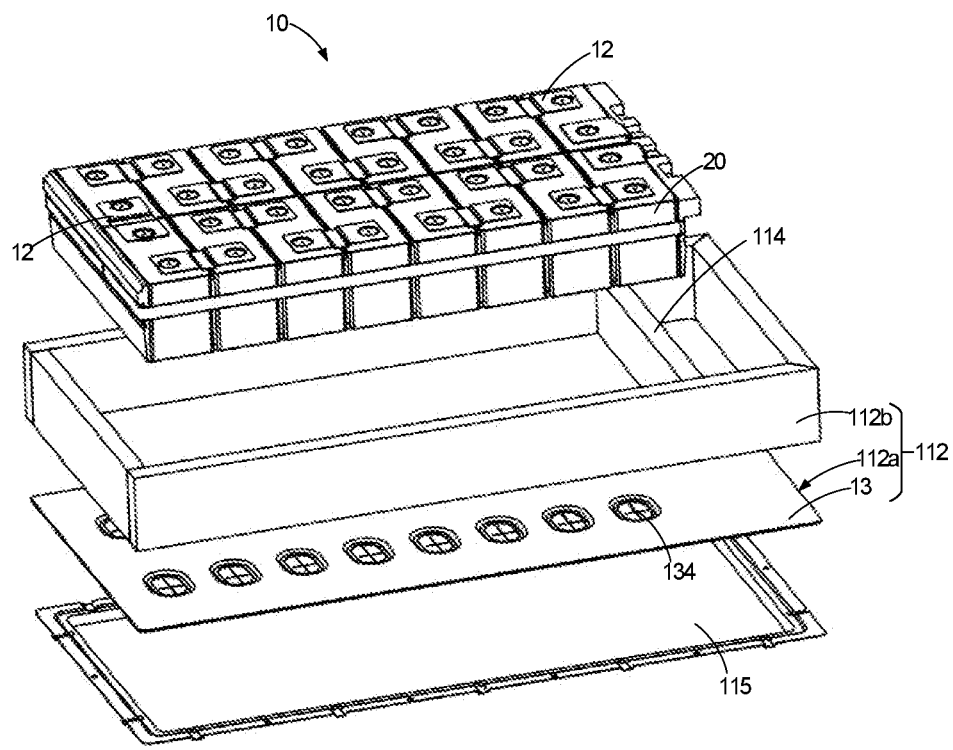
FIG. 6 shows a schematic exploded view of a battery according to some embodiments of the present application.

FIGS. 5-6 show exploded views of a battery 10 according to some embodiments of the present application. As shown in FIGS. 5-6, the battery 10 may include a case 11 for enclosing a plurality of battery cells 20, and the case 11 can prevent liquid or other foreign matters from affecting the charging or discharging of the battery cells 20, where the plurality of battery cells 20 are electrically connected to each other via a bus component 12, and the battery 10 may provide a higher voltage after the plurality of battery cells 20 are connected in series or in parallel through the bus component 12. The case 11 may include a cover body 111 and a case shell 112. The cover body 111 and the case shell 112 may be combined together in a sealing manner to jointly enclose and form an electrical chamber 11a for accommodating the plurality of battery cells 20, but of course, they may also be combined with each other in an unsealing manner. In some embodiments, a thermal management component 13 may constitute a portion of the case 11 for accommodating the plurality of battery cells 20. For example, the thermal management component 13 may constitute a side portion 112b of the case shell 112 of the case 11 or constitute a portion of the side portion 112b, or as shown in FIG. 6, a thermal management component 13 may constitute a bottom portion 112a of the case shell 112 of the case 11 or constitute a portion of the bottom portion 112a. This design that the thermal management component 13 is used to constitute a portion of the case shell 112 is helpful to make a structure of the battery 10 more compact, improve effective utilization of space, and improve energy density.

Figure 7:
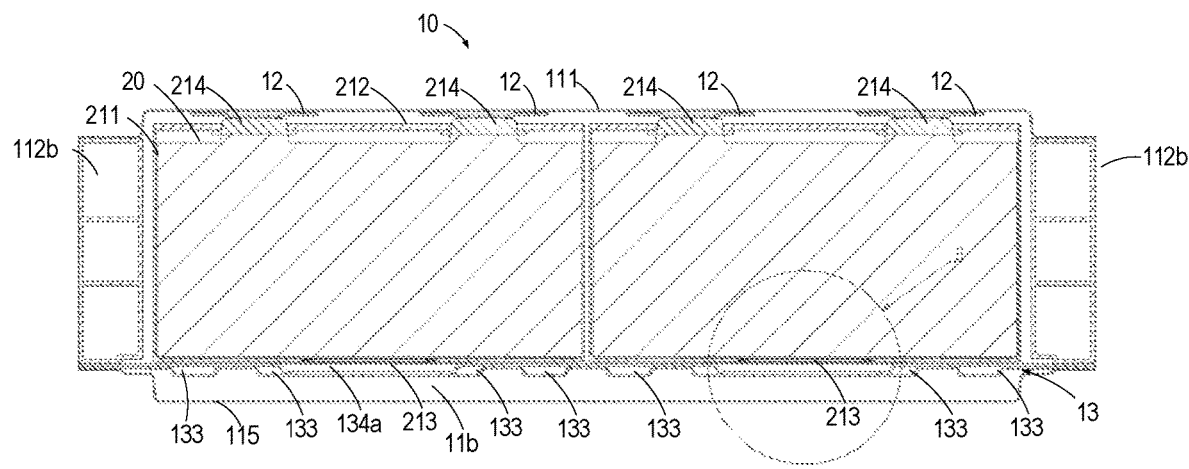
FIG. 7 illustrates a sectional view of a battery according to some embodiments of the present application.

In some alternative embodiments, the battery 10 may further include a protective member 115, as shown in FIGS. 6 and 7. The protective member 115 in the present application refers to a component arranged on a side of the thermal management component 13 away from the battery cell 20 to provide protection for the thermal management component 13 and the battery cell 20. In these embodiments, a collection chamber 11b may be arranged between the protective member 115 and the thermal management component 13.

Figure 8:
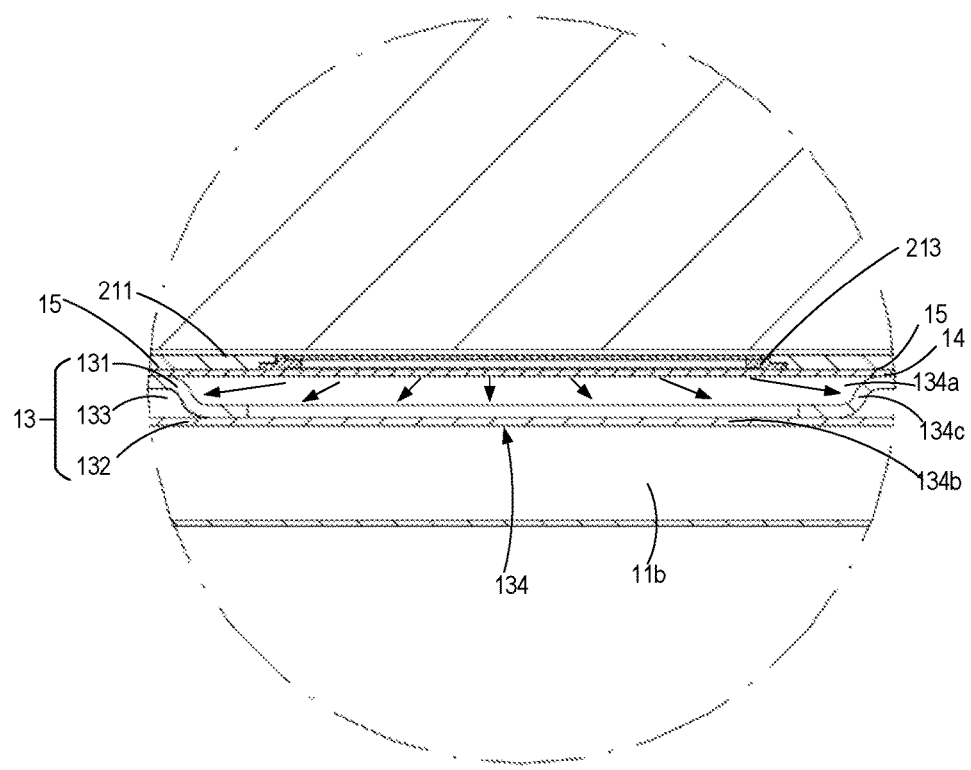
FIG. 8 shows an enlarged view of a part B of the battery shown in FIG. 7.

Referring to FIGS. 7-8, at least one battery cell 20 in the battery 10 includes a pressure relief mechanism 213. In some embodiments, each battery cell 20 in the battery 10 is provided with a pressure relief mechanism 213, or a pressure relief mechanism 213 may be provided on some battery cell(s) 20 in the plurality of battery cells 20, which may be more prone to thermal runaway due to its position in the battery 10 or characteristics of the other battery cells 20. The pressure relief mechanism 213 can be actuated when an internal pressure or temperature of the battery cell 20 reaches a predetermined threshold, to relieve the internal pressure of the battery cell 20.

The battery 10 also includes an attachment component adapted to be attached to the battery cell 20 by an adhesive 15, and the attachment component may be, for example, a thermal management component 13, a support component, or the like in the battery 10. In order to prevent the adhesive 15 such as thermally conductive silica gel from being applied between the attachment component and the pressure relief mechanism 213, thereby not preventing or not affecting the pressure relief mechanism 213 from being actuated and performing its designed function as described above, that is, a function that the pressure relief mechanism 213 is actuated when the internal pressure or temperature of the battery cell 20 is relatively large to form a channel or opening for relieving the internal pressure of the battery cell 20, the battery 10 may also be provided with an isolation component 14, which can prevent the adhesive 15 from being applied between the attachment component and the pressure relief mechanism 213. Hereinafter, an embodiment in which the attachment component is the thermal management component 13 and the design of the isolation component 14 involved therein will be exemplified below. It can be understood that in a case where the attachment component is the support component, a structure or configuration substantially the same as or similar to that of the isolation component 14 may be applied.

In FIG. 8, an isolation component 14 is schematically depicted, and the isolation component 14 at least surrounds an actuation region of a pressure relief mechanism 213 to prevent an adhesive 15 from entering the actuation region.

In this way, it can prevent any hindrance or adverse influence on the execution of the actuation action of the pressure relief mechanism due to the adhesive 15 flowing into the actuation region from any direction.

The isolation component 14 adopted in various embodiments of the present application may adopt various possible configurations, so that the foregoing adhesive used for assembling the battery cell 20 to the attachment component can be isolated from a space between the attachment component and the pressure relief mechanism 213, or so that the coated adhesive can be isolated from a space that may affect the pressure relief mechanism 213 to perform its designed function of pressure relief once the adhesive flows in. As will be seen in the following description of some preferred embodiments, the isolation component 14 may be designed to surround a partial region of the pressure relief mechanism 213. The partial region can form a relief channel relieving the internal pressure of the battery cell 20 when the pressure relief mechanism 213 is actuated (which may be referred to as an actuation region or a relief region), for the emissions to flow out, or may also be a region corresponding to the pressure relief mechanism 213 attached to the attachment component such as the thermal management component 13, so as to surround a space that is provided by the attachment component and allows the pressure relief mechanism 213 to be actuated (e.g., an avoidance structure 134 described below), or the like.

In some embodiments, the isolation component 14 may be attached to a region on the attachment component such as the thermal management component 13 corresponding to the pressure relief mechanism 213 before coating the adhesive. It should be noted that any member in the battery that are adhered together with the battery cell 20 by the adhesive may be considered as the attachment component or a portion of the attachment component, and these members may use the isolation component 14, that is, the isolation component 14 may be attached thereto before the adhesive is coated. In this way, when the adhesive is coated, the isolation component 14 can prevent the adhesive from entering a region on the attachment component corresponding to the pressure relief mechanism 213, especially corresponding to the pressure relief mechanism 213 for actuation to form a relief channel relieving the internal pressure of the battery cell for the emissions to flow out, thereby ensuring that the pressure relief mechanism 213 can be actuated and normally achieve its designed function. In addition, the use of the isolation component 14 may also accelerate the coating speed and accuracy of the adhesive without worrying about coating the adhesive to the region related to the actuation of the pressure relief mechanism 213, and save costs of production time.

Figure 9:
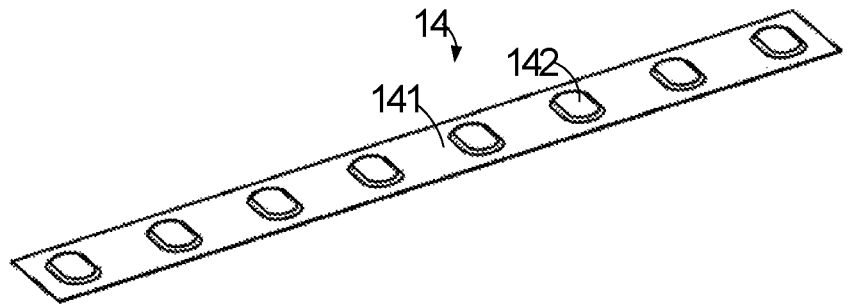
FIG. 9 shows a perspective view of an isolation component according to some embodiments of the present application.
Figure 10:
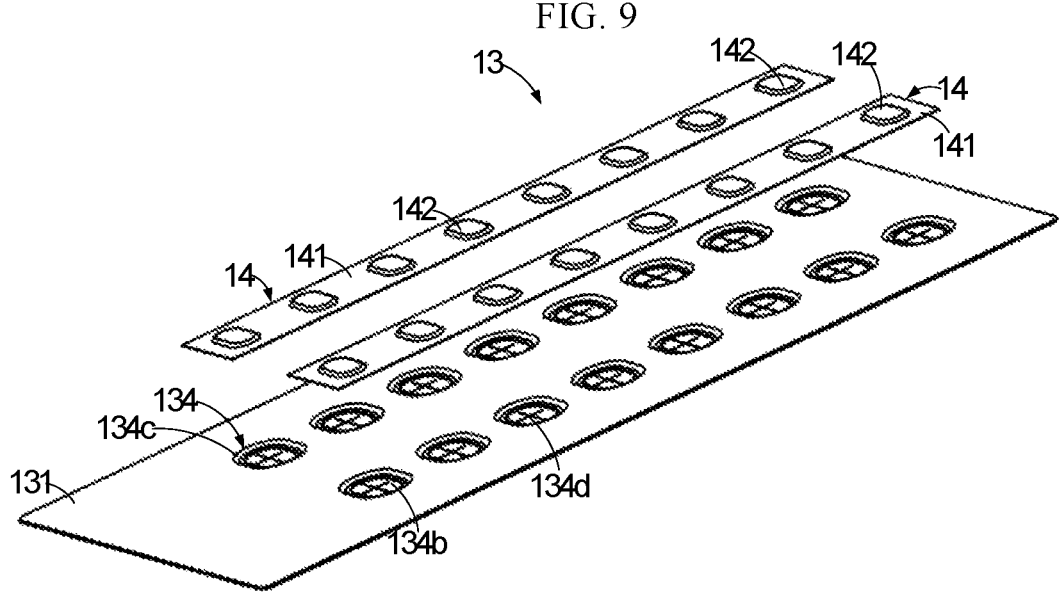
FIG. 10 shows an exploded view of an isolation component that has not yet been attached to a thermal management component according to some embodiments of the present application.
Figure 11:
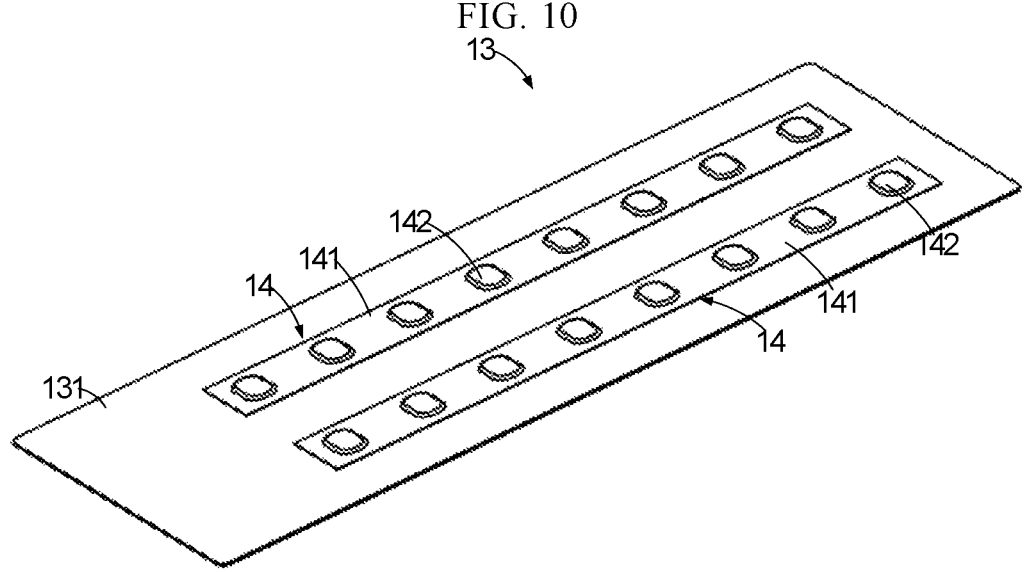
FIG. 11 shows an exploded view of an isolation component that has been attached to a thermal management component according to some embodiments of the present application.

FIG. 9 shows a perspective view of an isolation component 14 according to some embodiments of the present application. FIG. 10 shows an exploded view that the isolation component 14 shown in FIG. 9 and a thermal management component 13 as an example of an attachment component are not assembled together. FIG. 11 shows a perspective view that the isolation component 14 shown in FIG. 9 and the thermal management component 13 are attached together. According to embodiments shown in FIGS. 9-11, the isolation component 14 may be attached to an attachment component such as a thermal management component 13 before coating the adhesive, so that a special structural feature on the isolation component 14 at least corresponds to a relief mechanism 213 or an avoidance structure 134 provided on the attachment component, where the avoidance structure 134 can provide a space allowing the relief mechanism 213 to be actuated. The specific structure and features of the avoidance structure 134 involved will be described in detail below.

As shown in FIGS. 9-11, according to some preferred embodiments of the present application, the isolation component 14 may include a main body 141 and a plurality of protrusions 142. The main body 141 is adapted to be attached or assembled to an attachment component such as a thermal management component 13. The protrusion 142 protrudes outward from a surface of the main body 141, and the protrusion 142 is arranged to be aligned with the pressure relief mechanism 213 or a relief region of the pressure relief mechanism 213 or an avoidance structure 134 or an avoidance chamber 134a in some embodiments described below in a protruding direction when the main body 141 is attached to the attachment component. Although in the example shown in FIGS. 10-11, the protrusion 142 is arranged to be aligned with the avoidance structure 134, in conjunction with FIG. 8 it is easy to understand that the arrangement of the avoidance structure 134 itself corresponds to the pressure relief mechanism 213 or both of which are aligned with each other, so the protrusion 142 may also be considered to be aligned with the pressure relief mechanism 213 or its actuation region (or relief region). Or, in other unshown embodiments, for example, in an example where the battery 10 is not provided with the avoidance structure 134, the protrusion 142 may also be arranged to be directly aligned with the pressure relief mechanism 213 or aligned with its actuation region or relief region.

It can be understood that the main body 141 and the protrusion 142 included in the isolation component 14 described here are not intended to indicate that the isolation component 14 must include independent components, and according to the following description of some preferred embodiments, it can be seen that a structure that the main body 141 and the protrusion 142 are integrally formed may be more advantageous in many aspects.

In the present application, the main body 141 may be understood as a portion of the isolation component 14 designed to be easily attached to an attachment component such as a support component or a thermal management component 13, and the protrusion 142 is designed to protrude from the surface of the main body 141, and an outer peripheral dimension of the protrusion 142 is greater than or equal to an outer peripheral dimension of the pressure relief mechanism 213 or at least greater than or equal to that of the relief region of the pressure relief mechanism 213. A height that the protrusion 142 is protruded is beneficial to preventing the adhesive from entering the space between the pressure relief mechanism 213 and the attachment component when applying the adhesive, so as to avoid the inflow adhesive from hindering the normal operation of the pressure relief mechanism 213. In this way, when coating the adhesive, on the one hand, a gluing machine may be guided to perform a gluing operation according to a predetermined path, and on the other hand, the adhesive may be ensured not to be coated to a position where the pressure relief mechanism 213 is located, thus ensuring that the adhesive can be coated to a properly position efficiently and accurately.

Although in the embodiment shown in FIGS. 9-11, the isolation component 14 is designed to have a long and thin sheet-shaped main body 141, and each main body 141 is provided with a row of protrusions 142, it can be understood that the main body 141 and the protrusion 142 in the present application may have various shapes according to the shape, structure and other factors of the pressure relief mechanism 213. In consideration of the weight energy density or volume energy density of the battery, the main body 141 generally has a relatively thin thickness, and therefore the main body 141 may generally be thin films or sheets of various shapes. Typically, a wall thickness of the isolation component 14 or the main body 141 may be between 0.01 mm and 0.05 mm. A shape of the protrusion 142 may be, for example, oblong, circular, elliptical, square, or the like as shown in the figure. Moreover, a single body 141 may also be designed to have a single protrusion 142, multiple rows of protrusions 142, or a plurality of protrusions 142 arranged in other manners, as long as the arrangement and relative position of the protrusions 142 on the surface of the body 141 can adapt to the setting position of the pressure relief mechanism 213 of the battery cell 20 in the battery.

According to some preferred embodiments, a single isolation component 14 may be designed to include a main body 141 and a plurality of protrusions 142 protruding from a surface of the main body 141, the main body 141 is integrally attached to the attachment component of the battery, and in such an attachment case, the plurality of protrusions 142 are respectively aligned with the pressure relief mechanisms 213 (or aligned with a relief region of the pressure relief mechanisms 213) of the plurality of battery cells 20 included in the battery 10 in one-to-one correspondence, so that each protrusion 142 can surround the relief mechanism 213 (or at least surround the relief region of the relief mechanism 213) with which it is aligned. Therefore, a process of assembling the isolation component 14 to the attachment component of the battery is relatively simple, and meanwhile, the adhesive coated or to be coated can be isolated from the pressure relief mechanism 213 of the plurality of battery cells 20 included in the battery or the relief region thereof in a relatively independent manner by using the plurality of protrusions 142. Moreover, this can also assist an operator to properly complete the coating of the adhesive with higher efficiency when coating the adhesive, so that the operator does not need to carefully coat the adhesive, which helps to reduce assembling costs and production costs of the battery 10.

Based on the foregoing solution, since a single isolation component 14 may be designed to have a plurality of protrusions 142, this design is particularly advantageous for a typical battery type in which a plurality of battery cells 20 are accommodated in one battery 10 and in which a plurality of battery cells 20 are respectively provided with pressure relief mechanisms 213, because when the single isolation component 14 is assembled in place, the plurality of protrusions 142 can play a role in isolating the adhesive for the pressure relief mechanisms 213 of the plurality of battery cells 20.

In a battery 10 including a plurality of battery cells 20, the battery cells 20 may generally be attached to the attachment component of the battery 10 in rows. In view of this situation, the isolation component 14 including a main body 141 and a plurality of protrusions 142 protruding from a surface of the main body 141 as described above may be adopted. The isolation component 14 may be an integrally formed sheet, and when the main body 141 of the isolation component 14 is attached to the attachment component of the battery 10, a plurality of protrusions 142 on the isolation component 14 may be respectively aligned with the pressure relief mechanisms 213 of the plurality of battery cells 20 included in the battery in one-to-one correspondence. Alternatively, the plurality of isolation components 14 for the plurality of battery cells 20 may be integrally formed, where positions of the plurality of isolation components 14 arranged in rows respectively correspond to positions of the pressure relief mechanisms 213 of the plurality of battery cells 20. In this way, an assembling process of assembling a plurality of battery cells 20 to the battery 10 is simpler and the assembling efficiency is higher.

According to some embodiments of the present application, as shown in the foregoing FIGS. 8, 10 and 12-13, an avoidance structure 134 may be provided on an attachment component such as a thermal management component 13, and an avoidance chamber 134a is formed between the avoidance structure 134 and the pressure relief mechanism 213, thereby providing a space for allowing the pressure relief mechanism 213 to be actuated. In these embodiments, arrangements of the isolation component 14 and the protrusions 142 therein correspond to arrangements of the avoidance structure 134 or the avoidance chamber 134 or both of which are aligned.

Specifically, the avoidance chamber 134a may be, for example, a closed cavity formed by joint enclosing of the avoidance structure 134 and the pressure relief mechanism 213. In this solution, for the discharge of the emissions from the battery cells 20, an inlet side surface of the avoidance chamber 134a may be opened due to the actuation of the pressure relief mechanism 213, while an outlet side surface opposite to the inlet side surface may be partially damaged and opened due to the high temperature and high pressure emissions, thus forming a relief channel for the emissions. According to some other embodiments, the avoidance chamber 134a may be, for example, a non-closed cavity formed by joint enclosing of the avoidance structure 134 and the pressure relief mechanism 213, and an outlet side surface of the non-closed cavity may originally have a channel for the emissions flowing out. As indicated by the arrows in the avoidance chamber 134a of FIG. 8, the emissions will be discharged outward in a fan-shaped direction.

Figure 12:
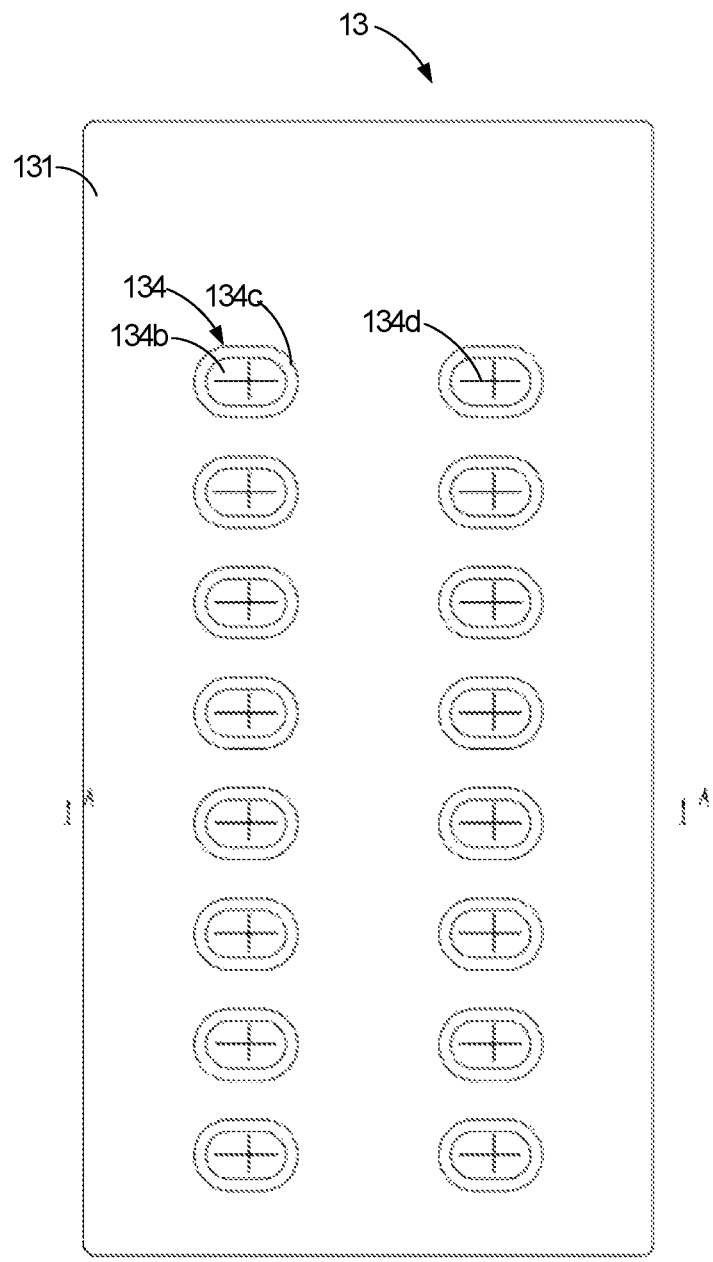
FIG. 12 shows a top view of a thermal management component according to some embodiments of the present application.
Figure 13:
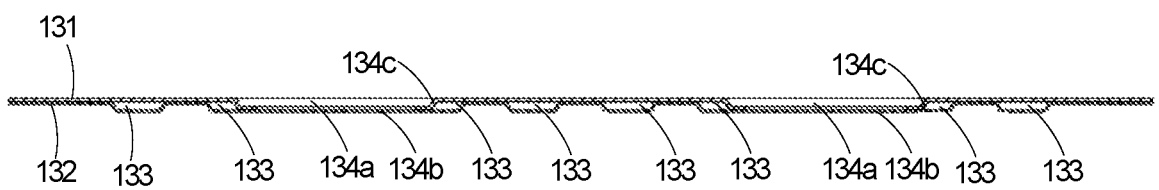
FIG. 13 shows a sectional view of the thermal management component of the present application shown in FIG. 12 in a direction of A-A.
Figure 14:
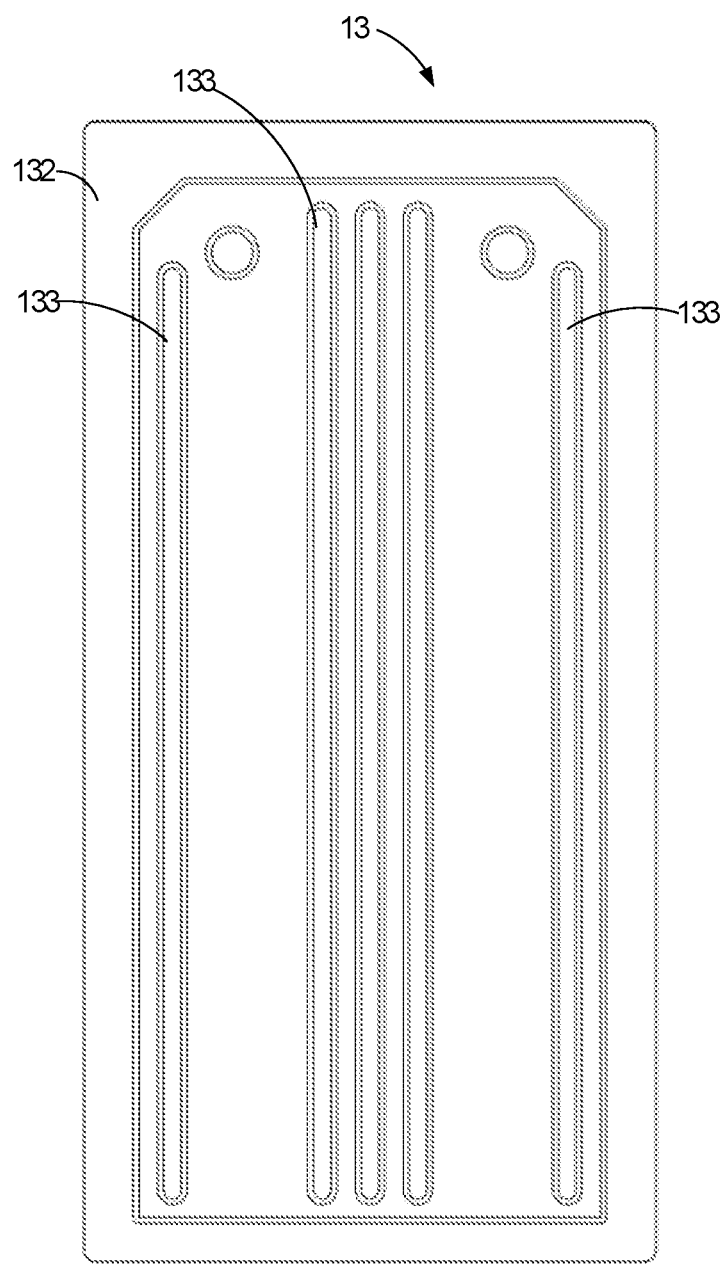
FIG. 14 shows a bottom view of the thermal management component of the present application shown in FIG. 12.

According to some embodiments, as shown in FIGS. 12-14, the thermal management component 13 further includes an avoidance bottom wall 134b at a bottom of the avoidance chamber 134 and an avoidance side wall 134c surrounding the avoidance chamber 134a. The avoidance bottom wall 134b referred to herein refers to a wall of the avoidance chamber 134a opposite to the pressure relief mechanism 213, and the avoidance side wall 134c is a wall adjacent to the avoidance bottom wall 134b and surrounding the avoidance chamber 134a at a certain angle, where an angle formed by the avoidance side wall 134c and the avoidance bottom wall 134b may preferably be in the range of 105°-175°. The thermal management component 13 may also be provided with a fluid channel 133 for accommodating a fluid, and the fluid may be a cooling medium, so as to cool the battery cell 20.

Accordingly, in these embodiments, the plurality of protrusions 142 of the isolation component 14 may be arranged as shown in FIGS. 10-11, where each protrusion 142 may surround its aligned avoidance chamber 134a, that is, the protrusion 142 is substantively covered and provided at or beyond an upper peripheral edge of the avoidance side wall 134c of the corresponding avoidance chamber 134a. That is, the protrusion 142 of the isolation component 14 is substantively covered and provided on the upper peripheral edge of the corresponding avoidance chamber 134a, thereby isolating the adhesive coated or to be coated from the avoidance structure 134 or the avoidance chamber 134a.

The thermal management component 13 and the isolation component 14 according to the foregoing preferred embodiment are very beneficial to improving the assembling efficiency of the battery. A process of assembling the isolation component 14 to the attachment component of the battery is relatively simple, and meanwhile, the adhesive coated or to be coated can be isolated from the avoidance chambers 134a corresponding to the pressure relief mechanisms 213 of the plurality of the battery cells 20 included in the battery in a relatively independent manner by using the plurality of protrusions 142. Thus, the coated adhesive may be prevented from influencing the pressure relief mechanism 213 of the battery cell 20 to perform its designed function, thereby ensuring the safety use of the battery. Moreover, this can also assist an operator to properly complete the coating of adhesive with higher efficiency when coating the adhesive.

For example, in the embodiment shown in FIGS. 10-11, when a single long and thin sheet-shaped main body 141 is assembled to the thermal management component 13 and is assembled in place, eight protrusions 142 on the main body 141 are respectively covered and provided on the aligned eight avoidance structures 134 or avoidance chambers 134a, so that the adhesive cannot enter the avoidance chambers 134a. In other words, an isolation operation of eight or more pressure relief mechanisms 213 of the battery cells 20 may be achieved by assembling a single isolation component 14 at one time.

It should be understood that the arrangement direction and position of the pressure relief mechanism 213 in the battery cell 20 are not limited in the present application. In fact, no matter whether the pressure relief mechanism 213 is arranged at a lower portion, upper portion or side portion of the battery cell 20, the relevant design of the isolation component 14 proposed in the present application may be properly applied, and it plays a beneficial role in ensuring that the pressure relief mechanism 213 achieves its designed function to relieve the high-temperature and high-pressure emissions in the battery cell when necessary, thus ensuring the safety use of the battery.

In some embodiments, as shown in FIGS. 12-14, the thermal management component 13 may be designed to have the following specific configuration. The thermal management component 13 may include a first thermally conductive plate 131 and a second thermally conductive plate 132. The second thermally conductive plate 132 is provided with a recess structure corresponding to a fluid channel 133, and the first thermally conductive plate 131 is provided with an avoidance structure 134. By assembling the first thermally conductive plate 131 and the second thermally conductive plate 132 together, for example, the first thermally conductive plate 131 and the second thermally conductive plate 132 may be assembled together by welding (such as brazing), a thermal management component 13 as described in the foregoing embodiment may be formed. Of course, it can be understood that this manner of forming the thermal management component 13 by assembling the first thermally conductive plate 131 and the second thermally conductive plate 132 to is only an example, and the foregoing thermal management component 13 may also be formed in other appropriate manners.

The flow channel 133 provided in the thermal management component 13 may at least partially surround the avoidance chamber 134, that is, the avoidance side wall 134c separates the flow channel 133 from the avoidance chamber 134a, and the avoidance side wall 134c may be provided with, for example, a weakened structure which is easy to be damaged by the high-temperature and high-pressure emissions. It should be understood that the weakened structure referred to in the present application may include, but is not limited to, a portion with reduced thickness, an indentation (e.g., a cross-shaped indentation 134d as shown in FIGS. 10 and 12), a fragile portion made of a fragile material, or a fragile portion made of a material with a lower melting point, or the like.

In this way, when the emissions from the battery cell 20 enter the avoidance chamber 134a, the weakened structure on the avoidance side wall 134c is damaged, so that the cooling medium such as cooling liquid in the flow channel 133 flows out into the avoidance chamber 134a, and then the cooling liquid is in contact with the high-temperature and high-pressure emissions from the battery cell 20, and absorbs a large amount of heat and is vaporized. In this way, the temperature and pressure of the high-temperature and high-pressure emissions from the battery cell 20 are significantly reduced in a short time, thus protecting other components such as the battery cells 20 in the battery 10 in which thermally runaway does not occur. Moreover, since the plurality of protrusions 142 of the isolation component 14 are substantively covered and provided at or beyond the upper peripheral edge of the avoidance side wall 134c of the corresponding avoidance chamber 134a, this design can make the emissions damage the weakened structure of the avoidance side wall 134c and introduce the cooling medium, and meanwhile, the isolation component 14 and the protrusion 142 thereof still play a certain role in blocking the adhesive such as thermally conductive silica gel located outside thereof, thus improving the safety of the battery.

According to some preferred embodiments of the present application, the isolation component 14 and the protrusion 142 therein may adopt one or more of the following specific designs, materials or preparation processes, and the isolation component 14 according to the following preferred examples may be applied to any of the foregoing embodiments of the present application in principle.

In some preferred embodiments, a height of the protrusion 142 in the isolation component 14 may be greater than or equal to a predetermined application height of the adhesive, which ensures that the adhesive will not enter or a small amount of adhesive enters a region between the pressure relief mechanism 213 and the attachment component when the adhesive is applied, it is especially advantageous when the attachment component is provided with the avoidance structure 134. In addition, the protrusion 142 is also configured to be capable of being compressed when the battery cell 20 is attached to the attachment component, to have a height consistent with that of the adhesive, thereby ensuring the connection between the attachment component and the battery cell 20. Typically, the protrusion 142 may have a height slightly greater than the predetermined application height of the adhesive before the battery cell 20 is attached to the attachment component of the battery. When the battery cell 20 and the attachment component of the battery are glued and pressed or engaged by the adhesive coated on an adhesive surface, the protrusion 142 can be compressed to a height consistent with that of the adhesive by simply pressing, with adhesive surfaces of the battery cell 20 and the attachment component of the battery that are substantially parallel to each other, the protrusion 142 may be compressed to a height consistent with the adhesive by simply pressing. At this time, no gap is left between the adhesive surfaces of the battery cell 20 and the attachment component of the battery by the protrusion 142, thereby ensuring that the adhesive is isolated from a region where the pressure relief mechanism 213 is actuated and where channel for the emissions is formed.

In some preferred embodiments of the present application, the isolation component 14 may be made of a thermoplastic material by a blister process. This helps to simplify a manufacturing process of the isolation component 14 and reduce the costs. Moreover, for the isolation component 14 including the main body 141 and the plurality of protrusions 142, it is particularly economical to make such an isolation component 14 by using the thermoplastic material through the blister process. For example, a plurality of protrusions 142 may be processed and formed on the basis of a piece of sheet or film made of the thermoplastic material by a blister process, so as to produce the isolation component 14.

In some embodiments, the isolation component 14 is also made of a material which is easily damaged by the emissions from the battery cell 20, so that the emissions can easily break through the isolation component 14. Alternatively, the protrusion 142 or the whole isolation component 14 may be made of materials or structures which are easily damaged by high temperature and high pressure emissions or have low penetration strength. According to some preferred embodiments, the protrusion 142 or the whole isolation component 14 may be made of a thermoplastic material with a melting point not higher than a discharge temperature of the emissions, so that the isolation component 14 has relatively high structural strength in a general use state where thermally runaway does not occur in the battery cell 20, and can be reliably damaged by the high-temperature and high-pressure emissions in a relatively short time in an emergency case where thermally runaway occurs in the battery cell 20.

It can be understood that, expect that the isolation component 14 may adopt the structure including the main body 141 and the protrusion 142 protruding from the surface of the main body 141, according to some other embodiments, the isolation component 14 may also adopt a structure without the protrusion 142, but a special coating layer such as an adhesive-repellent layer, for preventing the adhesive from being applied between the attachment component and the pressure relief mechanism 213 is provided at a position corresponding to the protrusion 142 in the foregoing embodiments. In other words, in this embodiment, a region coated with the adhesive-repellent layer covers at least a peripheral edge of each avoidance chamber 134a on a side facing the corresponding pressure relief mechanism 213, or at least covers the actuation region or the relief region of the pressure relief mechanism 213.

Of course, according to some other embodiments, on the basis of the isolation component 14 including the main body 141 and the protrusion 142 protruding from the surface of the main body 141, an adhesive-repellent layer may be further provided on the surface of the protrusion 142, so as to more reliably isolate the adhesive from the actuation region where the pressure relief mechanism 213 is actuated and where a channel for the emissions is formed or isolate the adhesive from the avoidance chamber 134a.

The battery according to embodiments of the present application is described above with reference to FIGS. 1 to 14, and a method and device for producing a battery according to embodiments of the present application will be described below with reference to FIGS. 15 and 16. For the parts that are not described in detail, reference is made to the foregoing embodiments.

Figure 15:
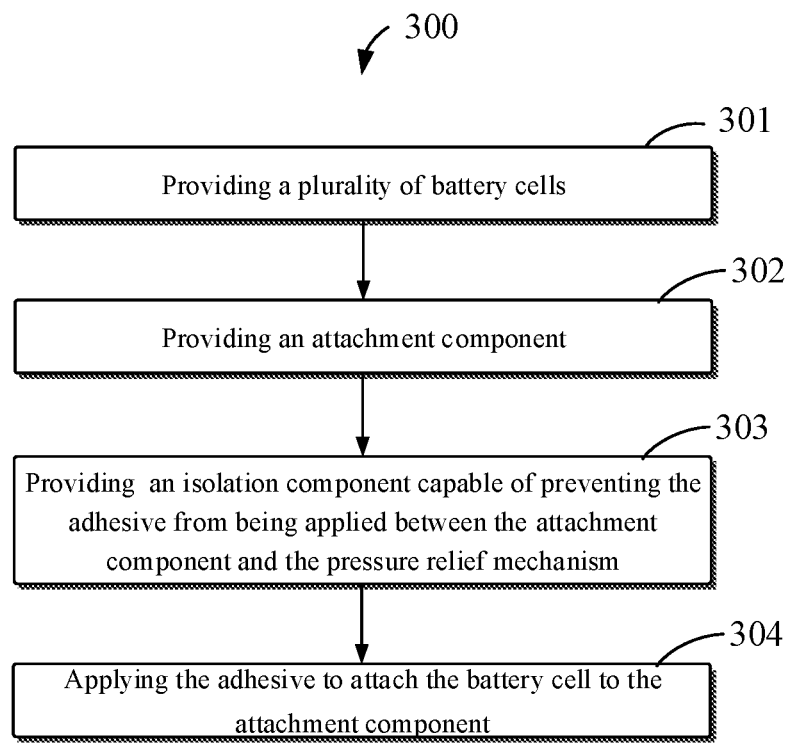
FIG. 15 shows a schematic flowchart of some embodiments of a method for producing a battery according to the present application.

Specifically, FIG. 15 shows a schematic flow chart of a method 300 for producing a battery according to an embodiment of the present application. As shown in FIG. 15, the method 300 includes: 301, providing a plurality of battery cells, at least one battery cell of the plurality of battery cells including a pressure relief mechanism configured to be capable of being actuated when an internal pressure or temperature of the battery cell reaches a threshold, to relieve the internal pressure; 302, providing an attachment component adapted to be attached to the battery cell by an adhesive; 303, providing an isolation component configured to be capable of preventing the adhesive from being applied between the attachment component and the pressure relief mechanism; and 304, applying the adhesive to attach the battery cell to the attachment component.

By providing the isolation component, it is possible to prevent the adhesive from being applied between the attachment component and the pressure relief mechanism in an effective manner in a process of battery production. Meanwhile, application efficiency and accuracy of the adhesive could be improved, thereby improving production efficiency of the battery.

In some embodiments, the pressure relief mechanism has an actuation region, and the pressure relief mechanism is configured, when the internal pressure or temperature of the battery cell reaches the threshold, to be capable of forming a relief channel for relieving the internal pressure in the actuation region; and the isolation component has a main body and a protrusion arranged protruding from a surface of the main body, the protrusion is arranged to correspond to a position of the actuation region of the pressure relief mechanism, and the protrusion is configured to at least surround the actuation region to prevent the adhesive from entering the actuation region.

In some embodiments, the attachment component includes an avoidance structure configured to provide a space allowing the pressure relief mechanism to be actuated, and an avoidance chamber is formed between the avoidance structure and the pressure relief mechanism, and the isolation component has a main body and a protrusion arranged protruding from a surface of the main body, the protrusion is arranged to correspond to a position of the avoidance chamber, and the protrusion is configured to at least surround a peripheral edge of the avoidance chamber facing the pressure relief mechanism to prevent the adhesive from entering the avoidance chamber.

Based on the foregoing embodiments, it is possible to prevent the adhesive from being applied to a surface of the pressure relief mechanism or an avoidance chamber in a simple and effective manner in a process of battery production, thereby avoiding the adhesive from hindering the pressure relief mechanism when it is actuated. Moreover, an isolation component can be flexibly processed and manufactured according to actual needs, so that the manufactured single isolation component can achieve the effect of isolating the adhesive with a plurality of protrusions respectively corresponding to the actuation region of the plurality of pressure relief mechanisms or respectively corresponding to the plurality of avoidance chambers, which is helpful for reducing the production costs.

In some preferred embodiments, the providing the isolation component includes forming the protrusion on the surface of the main body by a blister process. By adopting the blister process, the required isolation component may be processed and manufactured conveniently and at a low cost. For the manufacture of a single isolation component provided with a plurality of protrusions, this processing and manufacturing advantage is particularly remarkable.

Figure 16:
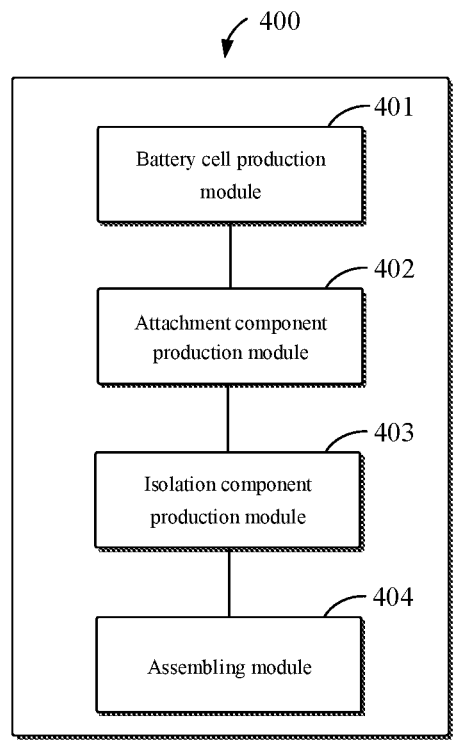
FIG. 16 shows a schematic structural diagram of some embodiments of a device for producing a battery according to the present application.

FIG. 16 is a schematic block diagram of a device 400 for producing a battery according to an embodiment of the present application. As shown in FIG. 16, the device 400 according to some embodiments of the present application includes: a battery cell production module 401 for producing a plurality of battery cells, at least one battery cell of the plurality of battery cells including: a pressure relief mechanism configured to be capable of being actuated when an internal pressure or temperature of the battery cell reaches a threshold, to relieve the internal pressure; an attachment component production module 402 for producing an attachment component adapted to be attached to the battery cell by an adhesive; an isolation component production module 403 for producing an isolation component configured to be capable of preventing the adhesive from being applied between the attachment component and the pressure relief mechanism; and an assembling module 404 for mounting and fixing the isolation component relative to the battery cell or the attachment component, and applying the adhesive to attach the battery cell to the attachment component.

It should finally be noted that the foregoing embodiments are merely intended for illustrating rather than limiting the technical solutions of the present application. Although the present application is described in detail with reference to the foregoing embodiments, those of ordinary skill in the art should understand that they may still make modifications to the technical solutions described in the foregoing embodiments or make equivalent substitutions to some technical features thereof, but these modifications or substitutions can be made to the respective technical solutions without departing from the spirit and scope of the technical solutions of the embodiments of the present application.

What is claimed is:

1. A battery, comprising:
    a battery cell, comprising:
        a housing and a pressure relief mechanism configured to actuate when an internal pressure or temperature of the battery cell reaches a threshold to relieve the internal pressure;
        wherein the pressure relief mechanism is arranged on a bottom wall of the housing;
    an attachment component attached to the bottom wall of the housing, excluding the pressure relief mechanism, by an adhesive; and
    an isolation component situated to prevent the adhesive from being applied between the attachment component and the pressure relief mechanism;
    wherein the pressure relief mechanism has an actuation region and the pressure relief mechanism is configured to form a relief channel for relieving the internal pressure in the actuation region when the internal pressure or temperature of the battery cell reaches a threshold;
    wherein the isolation component has a main body and a protrusion arranged protruding from a surface of the main body, the protrusion arranged to correspond to a position of the actuation region of the pressure relief mechanism, and the protrusion configured to at least surround the actuation region to prevent the adhesive from entering the actuation region.

2. The battery according to claim 1, wherein the attachment component comprises an avoidance structure configured to provide a space allowing the pressure relief mechanism to be actuated, and
    wherein an avoidance chamber is formed between the avoidance structure and the pressure relief mechanism.

3. The battery according to claim 2, wherein the isolation component is configured to at least surround a peripheral edge of a side of the avoidance chamber facing the pressure relief mechanism to prevent the adhesive from entering the avoidance chamber.

4. The battery according to claim 2, wherein the isolation component has a main body and a protrusion arranged protruding from a surface of the main body, the protrusion is arranged to correspond to a position of the avoidance chamber, and the protrusion is configured to at least surround a peripheral edge of the avoidance chamber facing the pressure relief mechanism to prevent the adhesive from entering the avoidance chamber.

5. The battery according to claim 4, wherein a height of the protrusion is greater than or equal to a predetermined application height of the adhesive, and the protrusion is configured to be compressed when the battery cell is attached to the attachment component, to have a height consistent with that of the adhesive.

6. The battery according to claim 4, wherein the protrusion is formed on the surface of the main body by a blister process.

7. The battery according to claim 1, wherein the isolation component is configured to be capable of being damaged by emissions from the battery cell when the pressure relief mechanism is actuated.

8. The battery according to claim 7, wherein the isolation component is made of a thermoplastic material having a melting point not greater than a discharge temperature of the emissions.

9. The battery according to claim 1, wherein the isolation component comprises a coating for preventing the adhesive from being applied thereto.

10. The battery according to claim 1, wherein the attachment component comprises a thermal management component for accommodating a fluid to adjust a temperature of the battery cell.

11. The battery according to claim 10, wherein the avoidance structure is formed in the thermal management component, and the avoidance structure comprises an avoidance bottom wall and an avoidance side wall surrounding the avoidance chamber.

12. The battery according to claim 11, wherein the avoidance side wall is configured to be damaged when the pressure relief mechanism is actuated, such that the fluid flows out.

13. An apparatus, comprising:
    a battery, comprising:
        a battery cell, comprising:
            a housing and a pressure relief mechanism configured to actuate when an internal pressure or temperature of the battery cell reaches a threshold to relieve the internal pressure;
            wherein the pressure relief mechanism is arranged on a bottom wall of the housing;
        an attachment component attached to the bottom wall of the housing, excluding the pressure relief mechanism, by an adhesive; and
        an isolation component situated to prevent the adhesive from being applied between the attachment component and the pressure relief mechanism;
        wherein the battery is configured to provide electrical energy to the apparatus;
        wherein the pressure relief mechanism has an actuation region and the pressure relief mechanism is configured to form a relief channel for relieving the internal pressure in the actuation region when the internal pressure or temperature of the battery cell reaches a threshold;
        wherein the isolation component has a main body and a protrusion arranged protruding from a surface of the main body, the protrusion arranged to correspond to a position of the actuation region of the pressure relief mechanism, and the protrusion configured to at least surround the actuation region to prevent the adhesive from entering the actuation region.

* * * * *